United States Patent
Klais et al.

(10) Patent No.: US 7,121,377 B2
(45) Date of Patent: Oct. 17, 2006

(54) DUAL SHAFT RACK AND PINION STEERING ASSEMBLY

(75) Inventors: Matthew E Klais, Waterford, MI (US); William J Thomas, Bloomfield Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 357 days.

(21) Appl. No.: 10/740,005

(22) Filed: Dec. 18, 2003

(65) Prior Publication Data

US 2005/0093264 A1    May 5, 2005

Related U.S. Application Data

(60) Provisional application No. 60/515,255, filed on Oct. 29, 2003.

(51) Int. Cl.
*B62D 5/06* (2006.01)
(52) U.S. Cl. .................... 180/428; 280/93.514
(58) Field of Classification Search ........... 280/93.514, 280/773, 89.12, 93.5, 93.501, 93.502, 93.503, 280/93.507; 180/427, 428
See application file for complete search history.

(56) References Cited

U.S. PATENT DOCUMENTS

| | | | | |
|---|---|---|---|---|
| 1,136,503 A * | 4/1915 | Baucom | ................. | 280/93.503 |
| 1,452,554 A * | 4/1923 | Gardner | .................... | 280/89.12 |
| 1,625,224 A * | 4/1927 | Seawell | .................... | 280/89.12 |
| 1,760,749 A * | 5/1930 | Gillespie | ................ | 280/93.511 |
| 1,840,115 A * | 1/1932 | Lee | ........................ | 280/93.511 |
| 2,128,329 A * | 8/1938 | Schjolin | ................... | 280/93.51 |
| 3,605,933 A * | 9/1971 | Millard | ........................ | 180/428 |
| 4,172,507 A * | 10/1979 | Millard | ........................ | 180/428 |
| 4,488,615 A * | 12/1984 | Millard | ........................ | 180/428 |
| 4,518,170 A * | 5/1985 | Musgrove | ................... | 280/93.513 |
| 4,536,003 A * | 8/1985 | Maurer et al. | ............. | 280/93.5 |
| 5,305,844 A * | 4/1994 | Ducote | .................... | 180/24.01 |
| 5,388,855 A * | 2/1995 | Yamamoto et al. | ... | 280/124.138 |
| 5,851,015 A * | 12/1998 | Klosterhaus | ............. | 280/93.51 |
| 5,934,404 A | 8/1999 | DeLellis et al. | | |
| 6,038,840 A * | 3/2000 | Ishimori et al. | ............. | 56/13.3 |
| 6,039,334 A * | 3/2000 | Ozeki | .................... | 280/93.514 |
| 6,086,075 A * | 7/2000 | O'Bryan et al. | ......... | 280/89.12 |
| 6,283,483 B1 * | 9/2001 | Johnson et al. | ........ | 280/86.758 |
| 6,325,396 B1 * | 12/2001 | Romig | ........................ | 280/98 |
| 6,543,568 B1 * | 4/2003 | Cole | .......................... | 180/428 |
| 2002/0175019 A1 * | 11/2002 | Cole | .......................... | 180/428 |
| 2004/0134300 A1 * | 7/2004 | Oberle et al. | ................. | 74/492 |

* cited by examiner

*Primary Examiner*—Paul N. Dickson
*Assistant Examiner*—Barry Gooden, Jr.
(74) *Attorney, Agent, or Firm*—Ralph E. Smith

(57) ABSTRACT

A dual shaft rack and pinion steering assembly for a vehicle includes a housing mounted to the vehicle and containing first and second parallel shafts linked to one another for synchronized axial movement. The first and second shafts are slidably positioned within the housing. One of the shafts includes a piston operable by hydraulic fluid contained within the housing. The other of the shafts includes a rack of teeth for meshing with a pinion gear driven by a steering column. The hydraulic fluid operates the piston by pressure coordinated with the driving of the rack by the pinion gear to assist the coordinated movement of the dual shaft assembly. The linked parallel shafts are connected to a drag link to direct a first wheel in response to axial movement of the shafts, which is further connected to a cross car link simultaneously directing a second wheel.

17 Claims, 8 Drawing Sheets

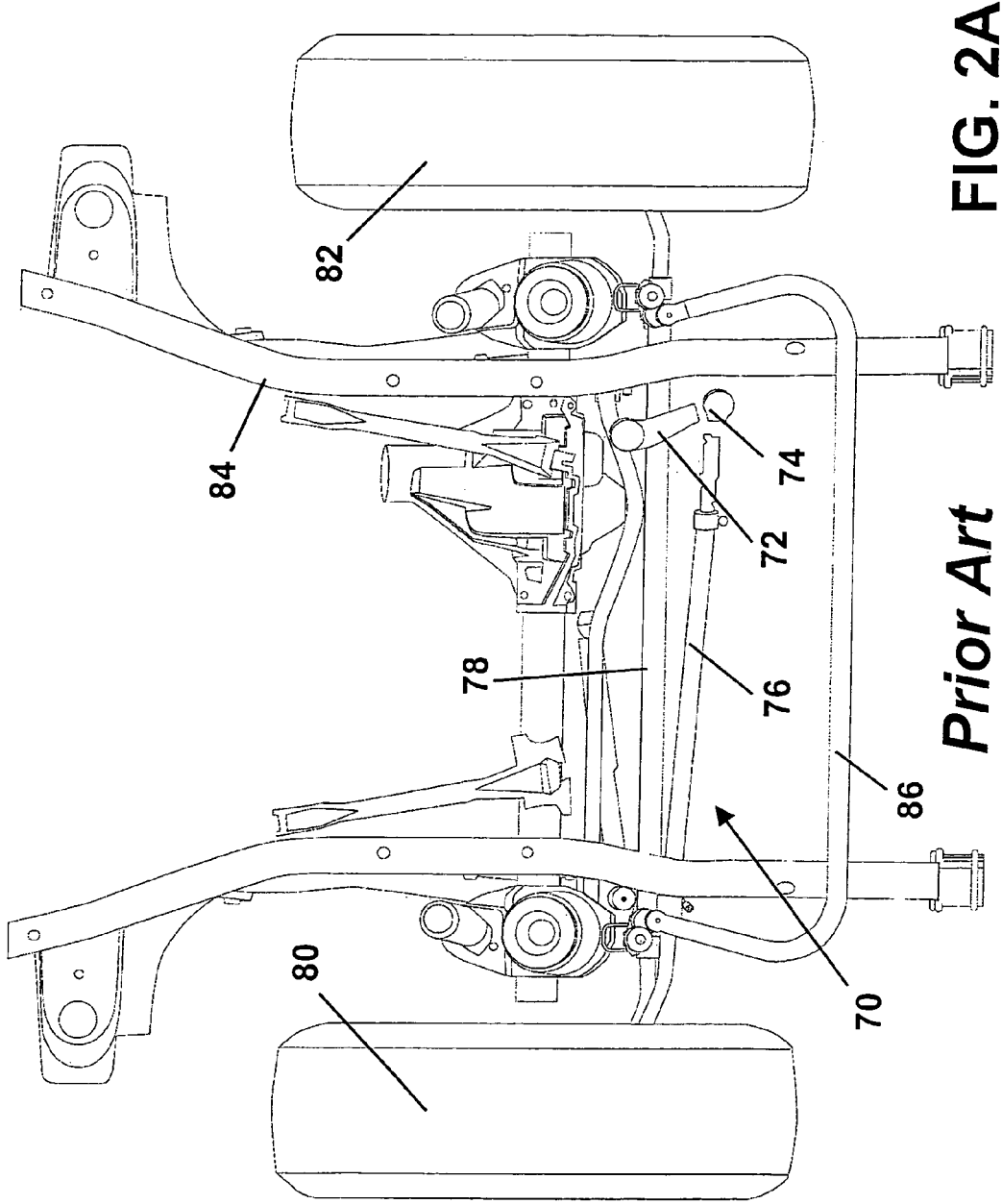
FIG. 2A  *Prior Art*

DUAL SHAFT RACK AND PINION STEERING ASSEMBLY

CROSS-REFERENCE TO RELATED APPLICATIONS

This application claims the benefit of U.S. Provisional Patent Application Ser. No. 60/515,255, filed Oct. 29, 2003.

STATEMENT REGARDING FEDERALLY SPONSORED RESEARCH

Not applicable.

BACKGROUND OF THE INVENTION

1. Field of the Invention

The present invention relates generally to vehicular steering systems. More particularly, the invention relates to a dual shaft activated single ended rack-and-pinion steering assembly and system.

2. Description of Related Art

Numerous strategies have been developed to actuate steering in motor vehicles. Some steering systems include a pair of steering knuckles supported on a chassis for vertical suspension purposes and for movement of wheels about a pair of axes. The wheels are rotatably mounted to the steering knuckles are free to pivot thereby allowing the vehicle to turn. A rack-and-pinion steering system typically includes a rack and pinion steering assembly mounted on the chassis, and a pair of tie rods attaching the steering gear to the steering knuckles. An integral gear steering system may include a steering gear operably attached to the chassis and a drag link positioned between the steering gear and the tie rods.

The integral gear steering system usually has greater mass than the rack-and-pinion steering system but relatively greater compliance due to dimensional clearances in the pivotal connections between the additional structural elements. The integral gear steering system may be more suitable for motor "heavy-use" vehicles subject to a wide range of loads (e.g., vans, trucks, sport utility vehicles, etc.) than the rack-and-pinion steering system unless complex and expensive structure is provided to account for the reduced compliance of the rack-and-pinion steering system relative to the integral gear steering system. The rack-and-pinion type steering system, however, may be advantageous to other types of steering arrangements (including integral gear steer systems) in that it is relatively lightweight, has a comparatively simple arrangement, provides superior steering performance, and requires a small mounting space.

FIG. 1 is a perspective view of a prior art rack-and-pinion assembly, shown generally by numeral 10. Assembly 10 comprises a cylindrical housing 20 including a slidable rack 22 partially enclosed therein. Rack 22 includes a plurality of teeth 24 that engage complementary teeth 26 on a pinion gear 28. Tie rods 30, 32. are positioned at opposing ends of the rack 22 for attachment to steering knuckles (not shown). A plurality of chassis mounts 34, 36 provides fixable attachment means to a vehicle chassis. Pinion gear 28 may be coupled to a steering wheel (not shown) and a shaft 38 so that when a vehicle operator turns the steering wheel, pinion gear teeth 26 rotatably mesh with corresponding rack teeth 24. The rotational movement of the steering wheel is converted into a linear motion on the rack 22 thereby providing the motion to turn the vehicle wheels. Typically, a gear reduction between the pinion gear 28 and rack 22 is provided to make it easier for the vehicle operator to steer.

Many rack-and-pinion type steering designs include means for hydraulically assisting the motion of the rack-and-pinion and, thus, the steering wheel. In this case, a piston 40 is slidably positioned within a fluid chamber 42 of the housing 20 whereby hydraulic fluid 44 pressure may build-up on either side of the piston 40 during steering maneuvers. The pressure difference forces the piston 40 to translate in a direction according to the rotation of a steering wheel thereby providing an assisting force to a vehicle operator. Hydraulic ports 46, 48 allow differential fluid flow on either side of the piston 40. To control the hydraulic fluid 44 pressures, a rotary valve 50 may be provided to sense force applied to the steering wheel. The rotary valve 50 controls a hydraulic pump (not shown), which can generate the differential fluid pressure on the piston 40 through a hydraulic circuit 52, which includes the hydraulic ports 46, 48.

The integral steer system may include a recirculating ball steering gear and linkage. The gear may contain a worm gear including a threaded shaft positioned within a correspondingly threaded block. The block is fixed to the shaft (and the steering wheel), so the steering wheel, shaft, and block may turn in unison. The worm gear may include a plurality of ball bearings positioned within threads of the shaft and block to reduce friction, wear, and steering tolerance or so-called "slop". The block may include additional teeth that engage a sector gear or like member attached to a cross link steering system.

FIG. 2A is an elevated perspective view of a prior art cross car link steering system 70 operably attached to first and second vehicle wheels 80, 82 wherein the steering system 70 is shown in a "straight" configuration. Steering system 70 includes a swinging pitman arm 72 that pivots with respect to a vehicle chassis 84 at a pivoting link 74. Pitman arm 72 is connected to a recirculating ball steering gear, which is connected to an intermediate shaft and a steering column (note: gear, shaft, and column are not shown). A drag link bar 76 is operably attached to the pitman arm 72 and the first vehicle wheel 82 through a steering knuckle (not visible). Drag link bar 76 typically incorporates an adjustment sleeve for steering wheel centering. A cross car link bar 78 is operably attached to both wheels 80, 82 and an anti-sway bar 86 is operably attached adjacent to the cross car link bar 78 ends.

FIG. 2B is an elevated perspective view of the cross car link steering system 70 wherein the steering system 70 is shown in a "right turn" configuration. During operation of the steering system 70, rotation (i.e., in a clockwise direction from the vehicle operator's perspective) of the steering wheel, column, shaft, and gear cause a swinging movement of pitman arm 72. The pitman arm 72 motion biases the drag link bar 76 toward the first vehicle wheel 82 thereby making it pivot to the "right". The first vehicle wheel 82 cooperates with the cross car link bar 78 to simultaneously turn the second wheel 82 to the "right". As with the rack-and-pinion steering assembly, turn assist may be provided by a high-pressure hydraulic system (not shown) wherein fluid pressure provides rotational force to the steering block.

Although the rack-and-pinion and integral steering systems may provide adequate steering in many vehicle applications, numerous changes may be implemented to improve these systems. For example, it would be desirable to provide a rack-and-pinion type steering system that is smaller in size. This would allow the system to be readily adapted for the smaller size allowances of certain "heavy-use" vehicles, which currently use mainly integral type steering systems. Indeed, the rack of current rack-and-pinion type steering systems adapted for "heavy-use" vehicles may contact a tire during certain turn maneuvers. As such, it would be desirable to provide a rack-and-pinion type steering system that is shorter in length.

Therefore, it would be desirable to provide a dual shaft rack-and-pinion type steering assembly and system that overcomes the aforementioned and other disadvantages.

BRIEF SUMMARY OF THE INVENTION

A first aspect of the present invention provides a rack-and-pinion assembly. The assembly comprises at least one housing including first and second shafts substantially parallel one to another. Portions of the first and second shafts are slidably positioned within the at least one housing. A piston is operably attached to the second shaft. A hydraulic fluid is positioned within a portion of the at least one housing. At least one connector is operably attached to the first and second shafts. Slidable movement of the first and second shafts is assisted by pressure differences of the hydraulic fluid biasing the piston.

A second aspect of the invention provides a rack-and-pinion steering system for a vehicle. The system comprises at least one housing including first and second shafts substantially parallel one to another, portions of the first and second shafts slidably positioned within the at least one housing. A piston is operably attached to the second shaft. A hydraulic fluid is positioned within a portion of the at least one housing. At least one connector is operably attached to the first and second shafts. A drag link bar is operably attached to the first shaft and to a first wheel. A cross car link is operably attached to the first wheel and a second wheel. Slidable movement of the first and second shafts is assisted by pressure differences of the hydraulic fluid biasing the piston. The first and second shafts cooperate with the drag link bar to turn the first wheel. The first front wheel cooperates with the cross car link to simultaneously turn the second wheel.

A third aspect of the invention provides a vehicle. The vehicle comprises first and second steerable tires operably attached to a chassis, and at least one housing including first and second shafts substantially parallel one to another. Portions of the first and second shafts slidably positioned within the at least one housing. A piston is operably attached to the second shaft. A hydraulic fluid is positioned within a portion of the at least one housing. At least one connector is operably attached to the first and second shafts. A drag link bar is operably attached to the first shaft and to a first wheel. A cross car link is operably attached to the first wheel and the second wheel. Slidable movement of the first and second shafts is assisted by pressure differences of the hydraulic fluid biasing the piston. The first and second shafts cooperate with the drag link bar to turn the first wheel. The first front wheel cooperates with the cross car link to simultaneously turn the second wheel.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE SEVERAL VIEWS OF THE DRAWINGS

The present invention will become more fully understood from the detailed description and the accompanying drawings, wherein:

FIG. 2A is an elevated perspective view of a prior art cross car link steering system operably attached to vehicle wheels wherein the steering system is shown in a "straight" configuration.

DETAILED DESCRIPTION OF THE INVENTION

Figure 1:
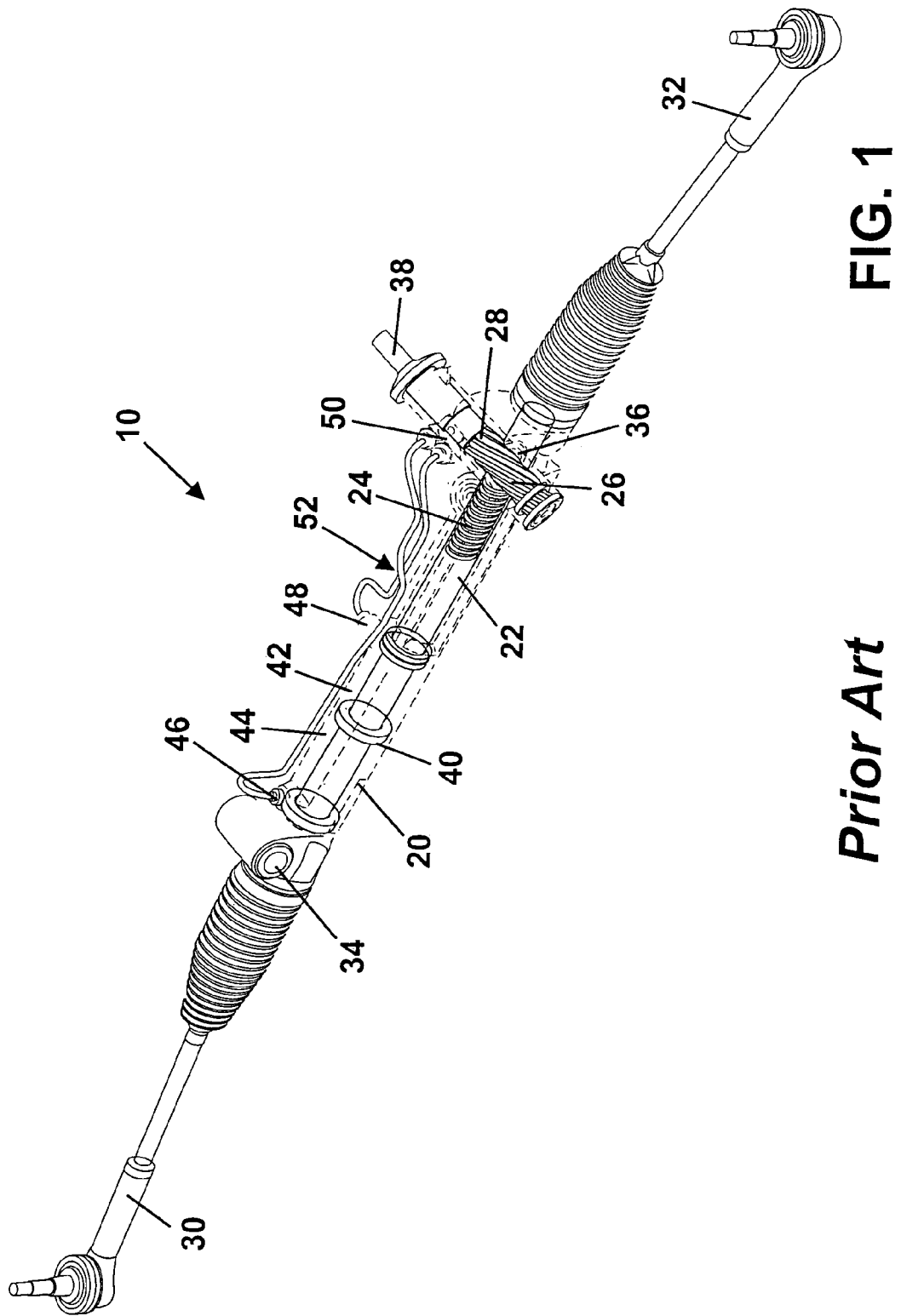
FIG. 1 is a partial cut-away perspective view of a prior art rack-and-pinion assembly.
Figure 2B:
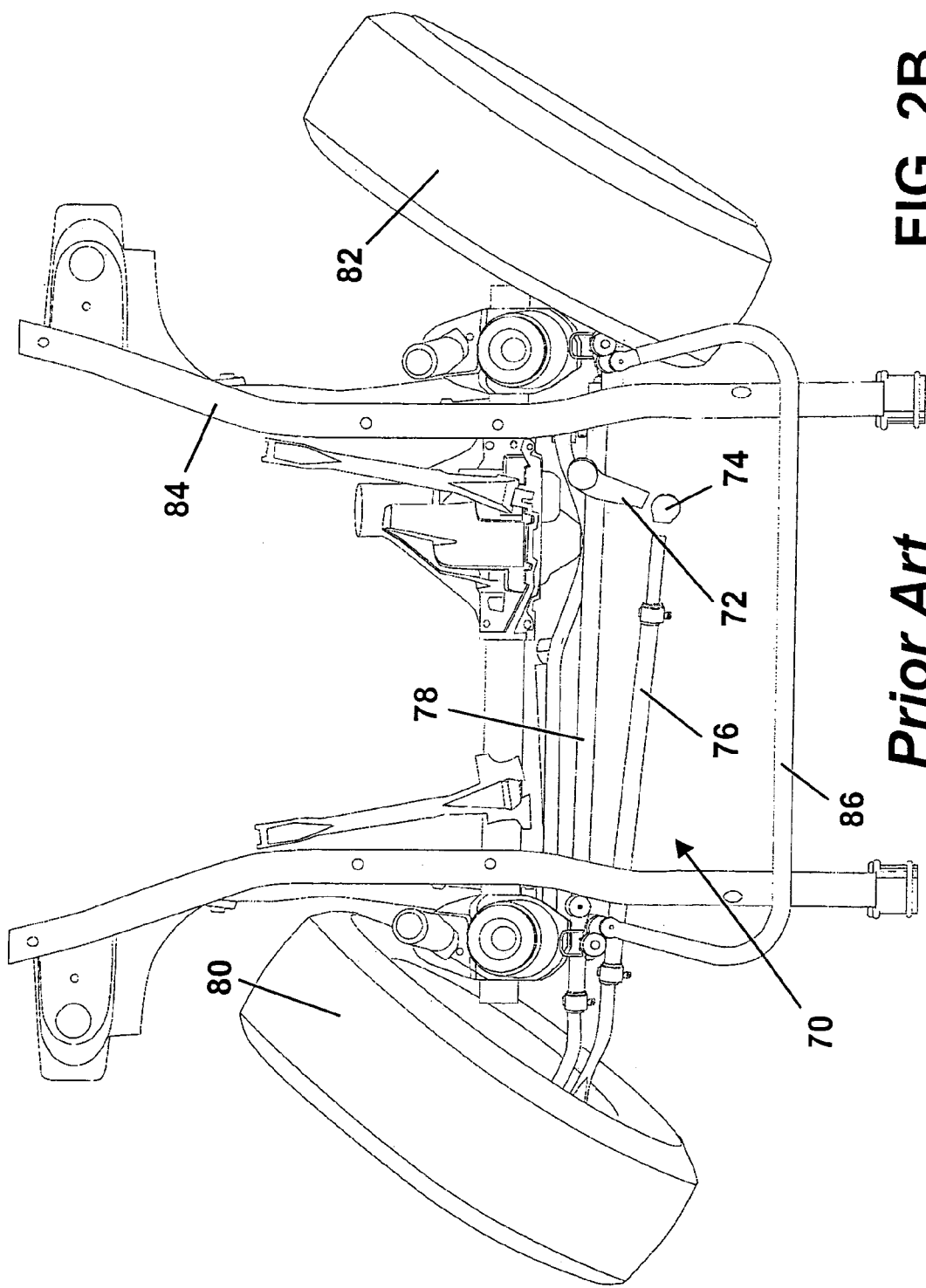
FIG. 2B is an elevated perspective view of a prior art cross car link steering system of FIG. 2A wherein the steering system is shown in a "right turn" configuration.
Figure 3:
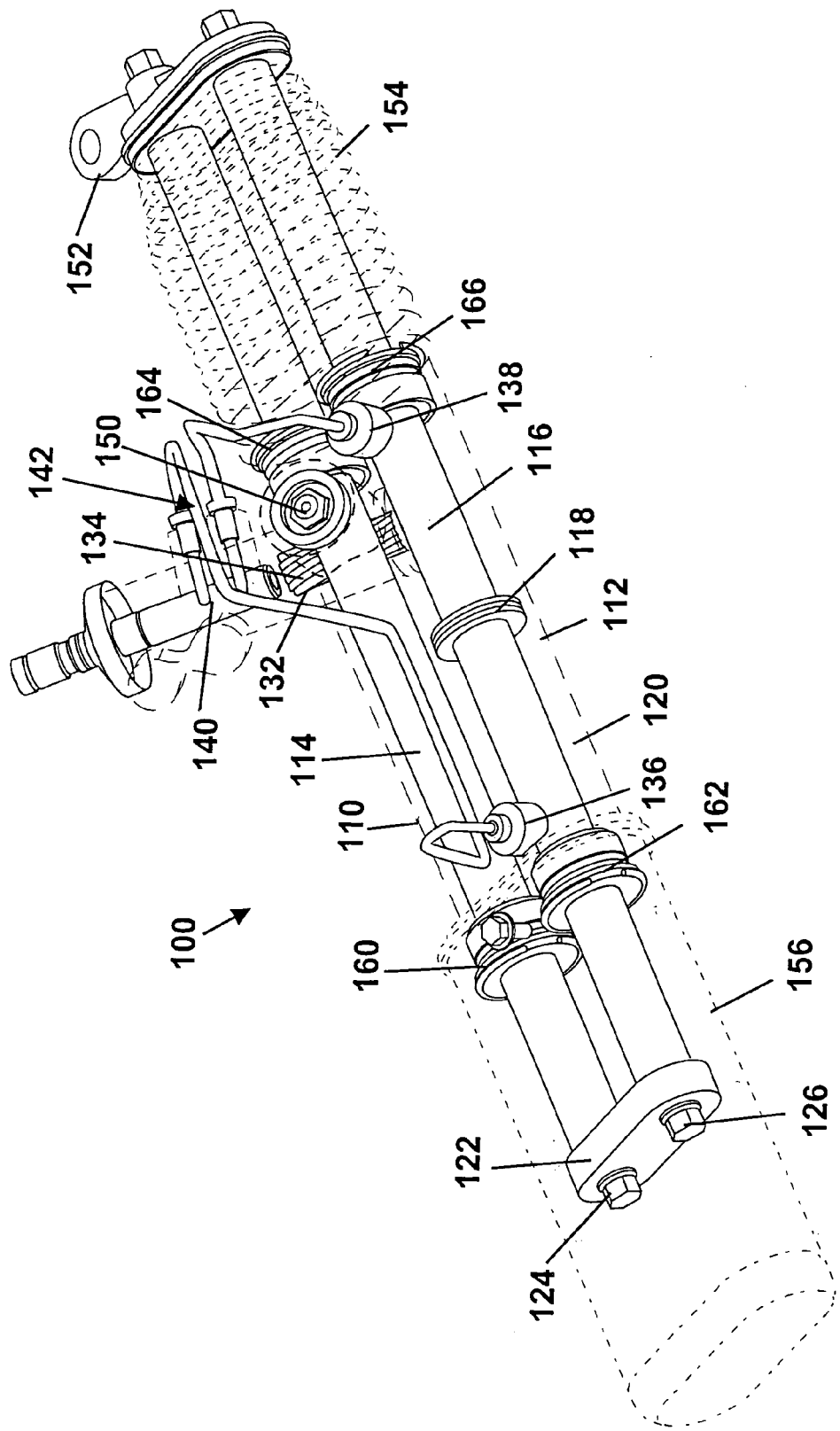
FIG. 3 is a partial cut-away perspective view of a dual shaft actuated single-ended rack-and-pinion assembly in accordance with the present invention.

Referring to the drawings, wherein like reference numerals refer to like elements, FIG. 3 is a partial cut-away perspective view of a dual shaft actuated single-ended rack-and-pinion assembly in accordance with the present invention, the assembly shown generally by numeral 100. The compact design (e.g., shorter length compared to conventional rack-and-pinion designs) allows the assembly 100 to be used in a variety of applications including those where space is restricted. For example, the assembly 100 may be adapted for use to control front steering of a motorized automobile, four-wheeled van, truck, automobile, and sport utility vehicle. Alternatively, the assembly 100 may control steering of numerous other motorized and non-motorized vehicles including two or more wheels.

Assembly 100 comprises a first housing 110 and a second housing 112 including a first shaft 114 and a second shaft 116, which are substantially parallel to one another. Portions of the shafts 114, 116 are slidably positioned within their respective housings 110, 112. A piston 118 is operably attached to the second shaft 116. A hydraulic fluid 120 is positioned within the second housing 112. At least one connector 122 is operably attached to the shafts 114, 116.

In one embodiment of the present invention, the connector 122 may comprise a shaft connection plate held fast to the shafts 114, 116 with bolts 124, 126 positioned therethrough. Housings 110, 112 may each comprise a cylinder, and the shafts 114, 116 may each comprise a relatively rigid unitary member. The housings 110, 112, shafts 114, 116, and other components of the assembly 100 may be manufactured from a material(s) such as steel, aluminum, metal, metal alloy, composite, polymer, and the like commonly used in the art for vehicle steering components. Those skilled in the art will recognize that the strategy for connecting the shafts 114, 116 one to another and the assembly 100 component material(s) may vary and are not limited to the described embodiments.

In one embodiment, the first shaft 114 may include a plurality of teeth (not visible) for engaging a plurality of corresponding teeth 132 on a rotatable pinion gear 134. Rotation of steering wheel (not shown) coupled to the pinion gear 134 causes translational movement of the shafts 114, 116 relative to their respective housings 110, 112. The translational movement of the shafts 114, 116 is assisted by pressure differences of the hydraulic fluid 120 biasing the piston 118. For example, during steering maneuvers, hydraulic fluid 120 pressure may build-up on either side of the piston 118. The pressure differences force the piston 118 to translate in a direction according to the rotation of a steering wheel thereby providing an assisting force to a vehicle operator. Hydraulic ports 136, 138 may be provided to allow differential fluid flow on either side of the piston 118. To control the hydraulic fluid 120 pressures, a rotary valve 140 may be provided to sense force applied to the steering wheel. The rotary valve 140 may control a hydraulic pump (not shown) as understood in the art. The hydraulic pump may generate the differential fluid pressure on the piston 118 through a hydraulic circuit 142, which includes the hydraulic ports 136, 138 and rotary valve 140, in accordance with the direction of the steering wheel rotation.

In one embodiment, at least one mount 150, may be provided for operably attaching the assembly 100 to a vehicle chassis. Mount 150 may comprise one or more bushings, bolts, and/or other attachment members. A drag link attachment 152, which in this case comprises an elongated arm member, may be operably attached to the shafts 114, 116. A boot 154 and a cover 156 may flank the housings 110, 112 at either side. Boot 154 and the cover 156 provide a seal from the elements (e.g., water, dirt, dust, etc.) while the shafts 114, 116 slide into and out of the housings 110, 112. Further, seals 160, 162, 164, 166 may surround the shafts 114, 116 at the housing 110, 112 ends. Boot 154 may include a corrugated surface that elongates and compresses during the translational movement of the shafts 114, 116. Boot 154, cover 156, and seals 160, 162, 164, 166 are preferably manufactured from a resilient material such a rubber, polymer, and the like.

Figure 4A:
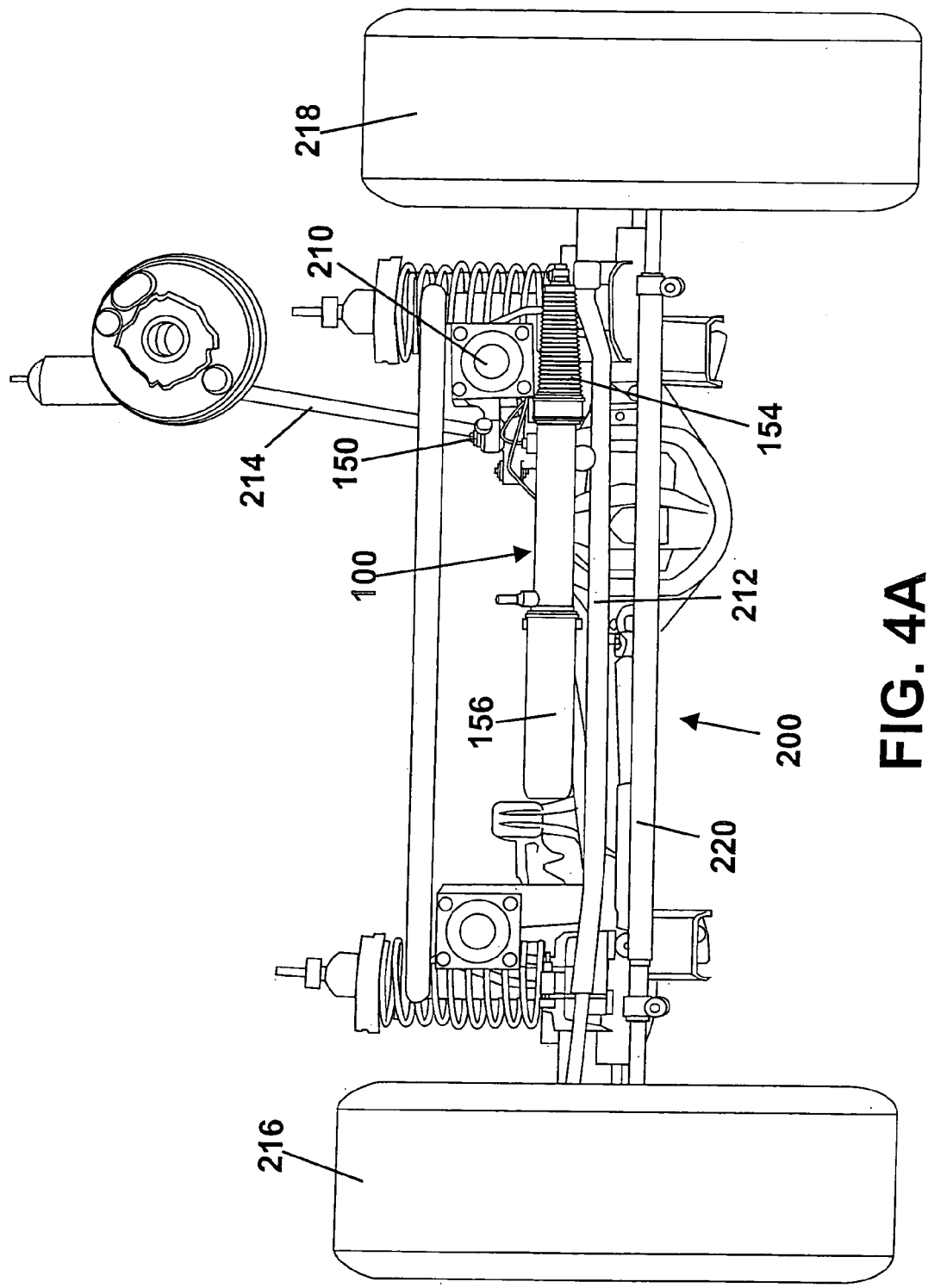
FIG. 4A is a perspective view of the assembly of FIG. 3 as part of a vehicle steering system in accordance with the present invention, wherein the steering system is shown in a "straight" configuration.
Figure 4B:
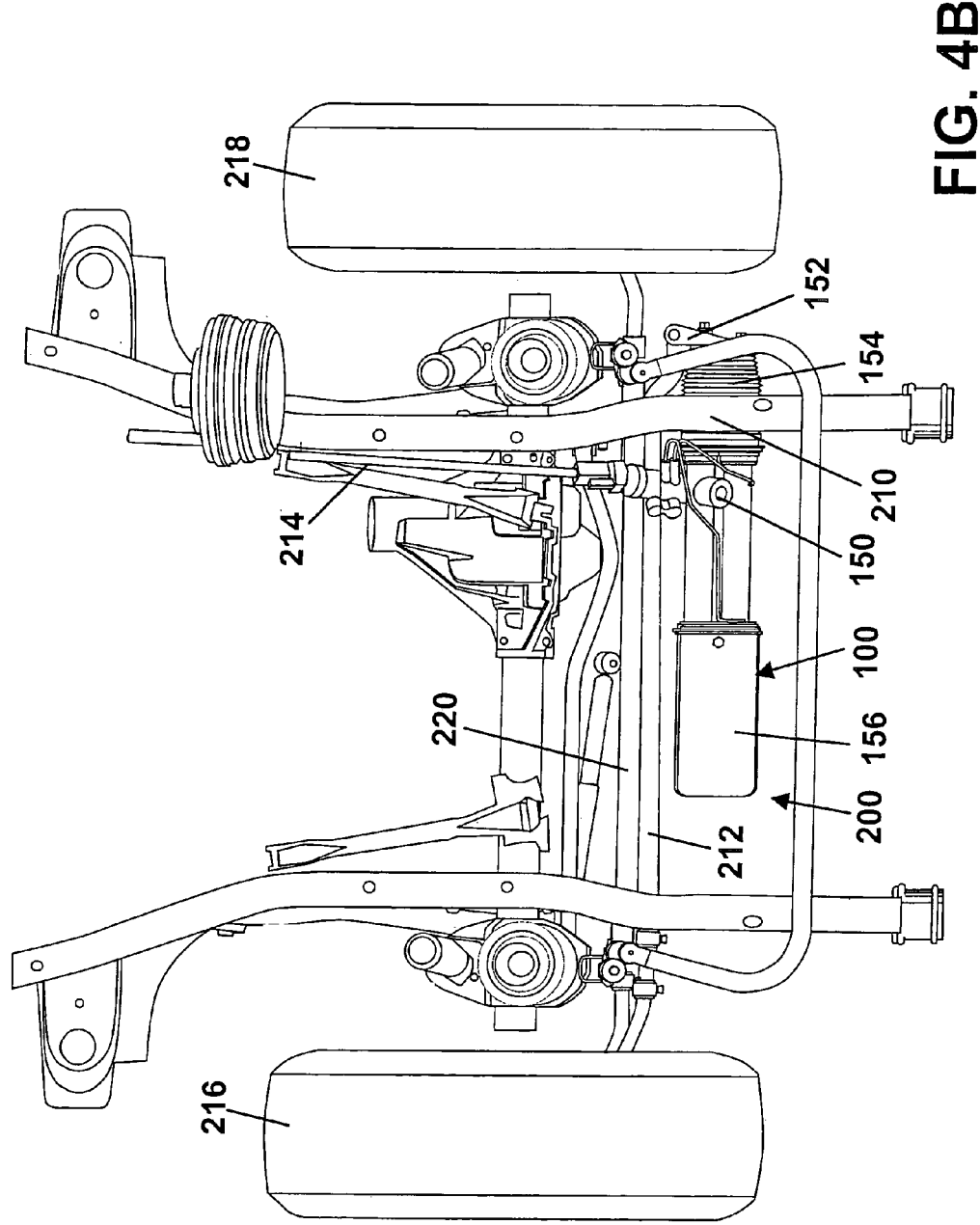
FIG. 4B is an elevated perspective view of the vehicle steering system of FIG. 4.

FIGS. 4A and 4B are alternative perspective views of the assembly 100 as part of a vehicle steering system 200 in accordance with the present invention. Steering system 200 is shown in a "straight" configuration and operably attached to a vehicle chassis 210. Assembly 100 may be mounted to the chassis 210 with the mount 150, and to a drag link bar 212 via drag link attachment 152. An intermediate shaft 214 may be operably connected to a steering column (not shown) and the pinion gear (not visible) for providing rotational input of the steering wheel. Drag link bar 212 may be operably attached to a first wheel 216, which may be attached to a second wheel 218 via a cross car link 220.

Figure 4C:
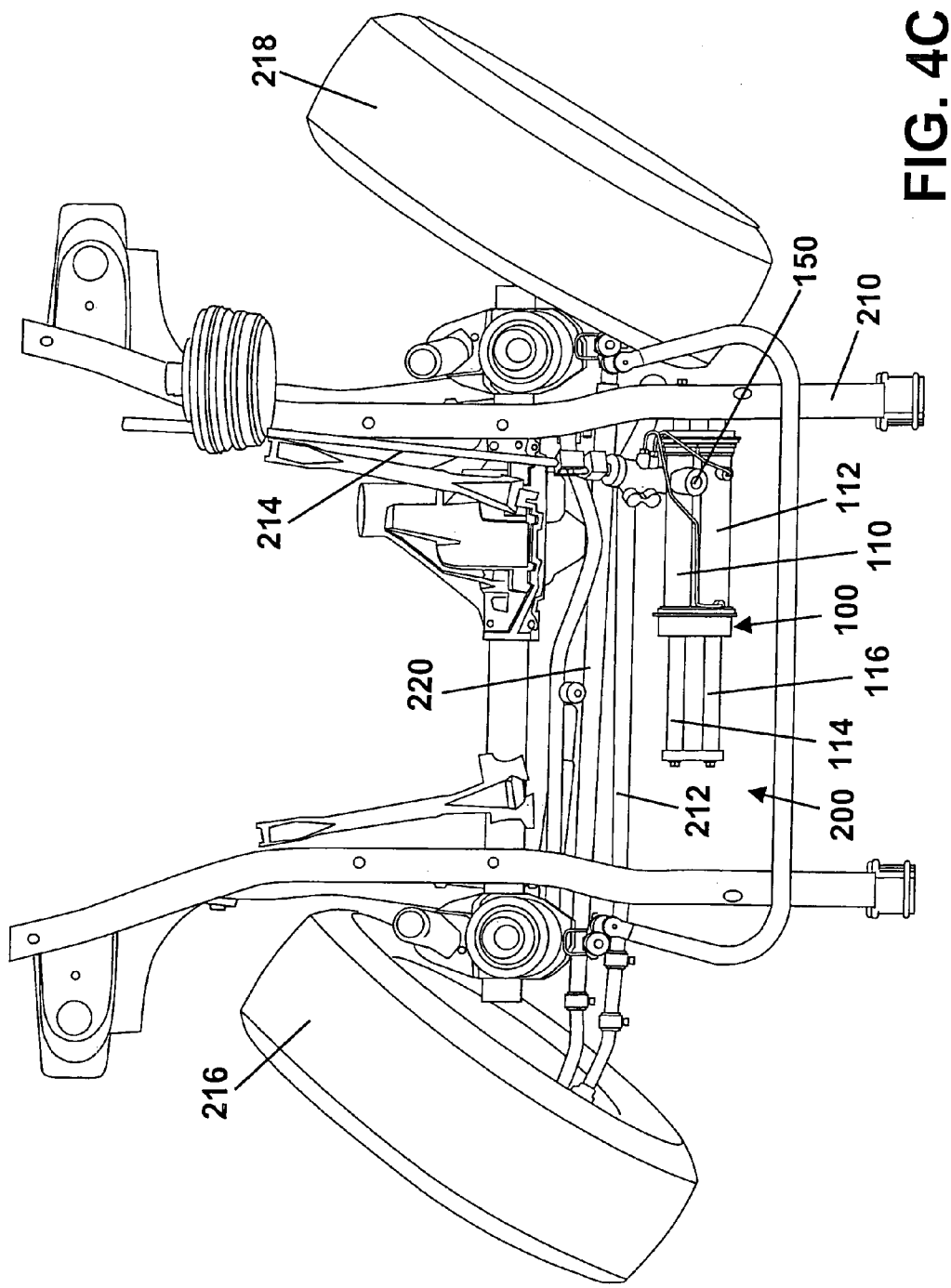
FIG. 4C is an elevated perspective view of the system of FIGS. 4A and 4B wherein the steering system is shown in a "right turn" configuration.

FIG. 4C is an elevated perspective view of the assembly 100 wherein the steering system 200 is shown in a "right turn" configuration. During operation of the steering system 200, rotation (i.e., in a clockwise direction from the vehicle operator's perspective) of the steering wheel, intermediate shaft 214, and pinion gear results in translational movement of the shafts 114, 116 relative to the housings 110, 112. As shown, the shafts 114, 116 may slide through the "right" side of the housings 110, 112 (i.e., the boot 154 and cover 156 shown in FIGS. 4A and 4B have been removed from view in FIGS. 4B and 4C to more clearly illustrate this). The drag link bar 212 may push against the first wheel 216 thereby turning it to the "right". The first wheel 216 may cooperate with the cross car link 220 to simultaneously turn the second wheel 218.

Figure 4D:
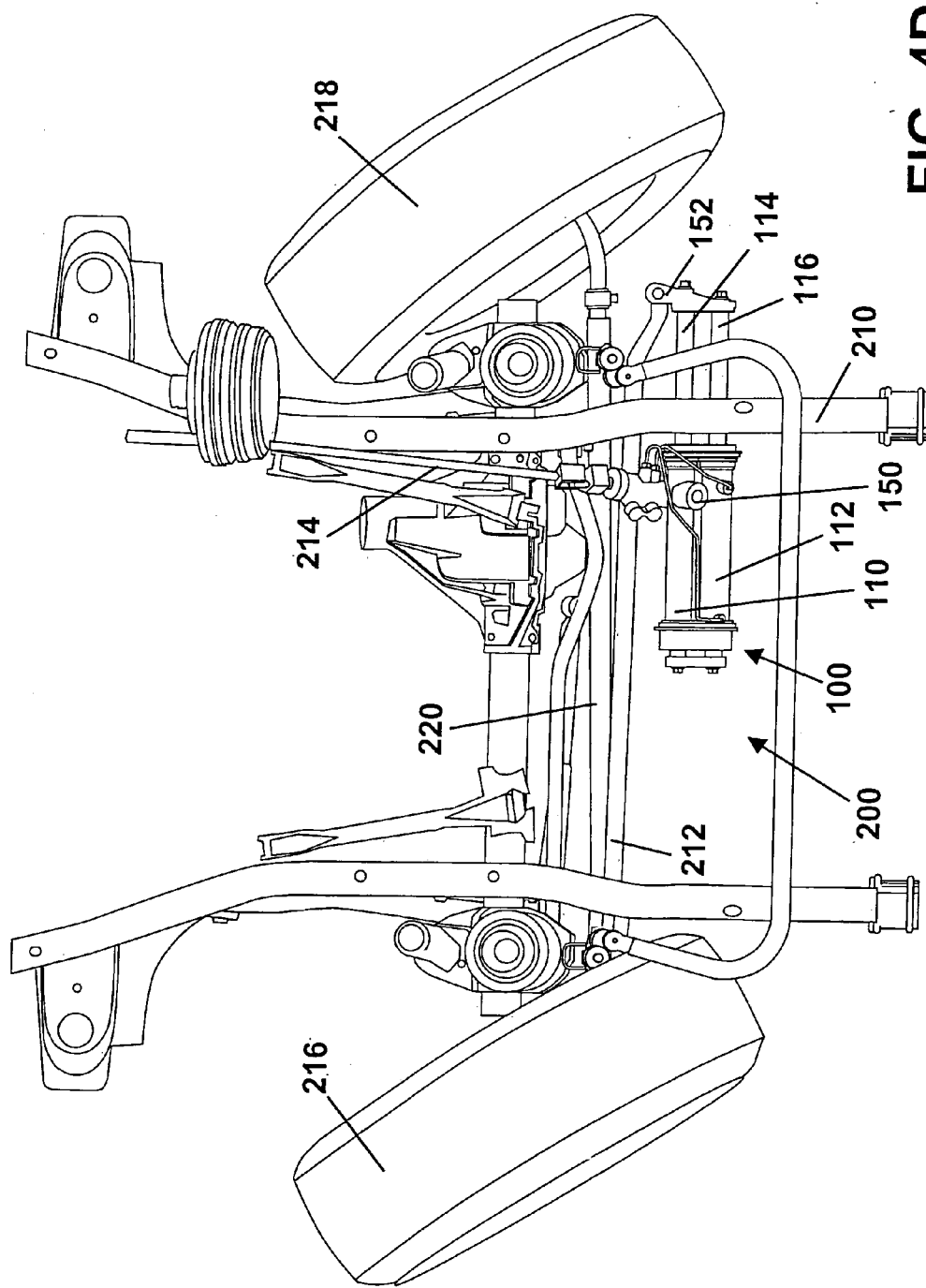
FIG. 4D is an elevated perspective view of the system of FIGS. 4A and 4B wherein the steering system is shown in a "left turn" configuration.

Turning the steering wheel in the opposite direction (i.e., in a counter-clockwise direction from the vehicle operator's perspective) may move the steering system 200 into a "left" turn configuration, shown in FIG. 4D. As shown, the shafts 114, 116 may slide through the "left" side of the housings 110, 112. The shafts 114, 116 and drag link bar 212 may pull against the first wheel 216 thereby turning in the opposite direction. First wheel 216 may cooperate with the cross car link 220 to simultaneously turn the second wheel 218. Those skilled in the art will appreciate that the dual shaft 114, 116 configuration of the assembly 100 provides more compact packaging than a conventional single shaft rack-and-pinion assembly. As such, the assembly 100 may be adapted for use in a variety of applications including those where space is restricted.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A rack-and-pinion assembly comprising;
   at least one housing including first and second shafts substantially parallel one to another, portions of the first and second shafts are slidably positioned within the at least one housing and wherein the first shaft comprises a plurality of teeth;
   a piston operably attached to the second shaft;
   a hydraulic fluid positioned within a portion of the at least one housing; and
   at least one connector operably rigidly attached to both the first and second shafts; wherein slidable movement of the first and second shafts is assisted by pressure differences of the hydraulic fluid biasing the piston.

2. The assembly of claim 1 wherein the connector comprises a shaft connection plate.

3. The assembly of claim 1 further comprising a rotatable pinion gear including a plurality of teeth corresponding to the first shaft teeth wherein rotation of the pinion gear causes the slidable movement of the first and second shafts.

4. The assembly of claim 1 further comprising a cover for receiving ends of the first and second shafts.

5. The assembly of claim 1 further comprising a drag link attachment operably attached to at least one of the first and second shafts.

6. The assembly of claim 1 further comprising at least one mount to operably attach the assembly to a vehicle chassis.

7. A rack-and-pinion steering system for a vehicle, the system comprising:
   at least one housing including first and second shafts substantially parallel one to another, portions of the first and second shafts are slidably positioned within the at least one housing and wherein the first shaft comprises a plurality of teeth;

a piston operably attached to the second shaft;

a hydraulic fluid positioned within a portion of the at least one housing;

at least one connector operably rigidly attached to both the first and second shafts;

a drag link bar operably attached to the first shaft and to a first wheel; and a cross car link operably attached to the first wheel and a second wheel;

wherein slidable movement of the first and second shafts is assisted by pressure differences of the hydraulic fluid biasing the piston; wherein the first and second shafts cooperate with the drag link bar to turn the first wheel; wherein the first front wheel cooperates with the cross car link to simultaneously turn the second wheel.

8. The system of claim 7 wherein the connector comprises a shaft connection plate.

9. The system of claim 7 further comprising a rotatable pinion gear including a plurality of teeth corresponding to the first shaft teeth wherein rotation of the pinion gear causes the slidable movement of the first and second shafts.

10. The system of claim 7 further comprising a cover for receiving ends of the first and second shafts.

11. The system of claim 7 further comprising a drag link attachment operably attached to at least one of the first and second shafts and the drag link bar.

12. The system of claim 7 further comprising at least one mount to operably attach the housing to a vehicle chassis.

13. A vehicle comprising:

first and second steerable tires operably attached to a chassis;

at least one housing including first and second shafts substantially parallel one to another, portions of the first and second shafts are slidably positioned within the at least one housing and wherein the first shaft comprises a plurality of teeth;

a piston operably attached to the second shaft;

a hydraulic fluid positioned within a portion of the at least one housing;

at least one connector operably rigidly attached to both the first and second shafts;

a drag link bar operably attached to the first shaft and to the first wheel; and a cross car link operably attached to the first wheel and the second wheel;

wherein slidable movement of the first and second shafts is assisted by pressure differences of the hydraulic fluid biasing the piston; wherein the first and second shafts cooperate with the drag link bar to turn the first wheel; wherein the first front wheel cooperates with the cross car link to simultaneously turn the second wheel.

14. The vehicle of claim 13 wherein the connector comprises a shaft connection plate.

15. The vehicle of claim 13 further comprising a rotatable pinion gear including a plurality of teeth corresponding to the first shaft teeth wherein rotation of the pinion gear causes the slidable movement of the first and second shafts.

16. The vehicle of claim 13 further comprising a cover for receiving ends of the first and second shafts.

17. The vehicle of claim 13 further comprising a drag link attachment operably attached to at least one of the first and second shafts and the drag link bar.

* * * * *